(12) United States Patent
Yan et al.

(10) Patent No.: US 8,358,467 B2
(45) Date of Patent: Jan. 22, 2013

(54) DURABLE ANTI-REFLECTION COATINGS

(75) Inventors: Yongan Yan, Thousand Oaks, CA (US); Anand Kaygee, Westlake Village, CA (US); Satyabrata Raychaudhuri, Thousand Oaks, CA (US)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/247,334

(22) Filed: Sep. 28, 2011

(65) Prior Publication Data
US 2012/0019915 A1    Jan. 26, 2012

Related U.S. Application Data

(63) Continuation of application No. PCT/US2010/052080, filed on Oct. 8, 2010.

(60) Provisional application No. 61/250,206, filed on Oct. 9, 2009.

(51) Int. Cl.
*G02B 1/10* (2006.01)
*G02B 5/28* (2006.01)

(52) U.S. Cl. ......... 359/581; 359/582; 359/586; 359/589

(58) Field of Classification Search .......... 359/577, 359/580, 581, 582, 586, 588, 589, 590; 351/159.01, 351/159.02, 159.09, 159.7–159.77
See application file for complete search history.

(56) References Cited

U.S. PATENT DOCUMENTS

| | | | |
|---|---|---|---|
| 5,719,705 A * | 2/1998 | Machol | ............ 359/581 |
| 6,657,691 B2 | 12/2003 | Ochiai et al. | |
| 7,138,185 B2 | 11/2006 | Obayashi et al. | |
| 7,144,598 B2 | 12/2006 | Moravec et al. | |
| 2002/0155265 A1 | 10/2002 | Choi et al. | |
| 2005/0245634 A1 | 11/2005 | Soutar et al. | |
| 2006/0099407 A1 | 5/2006 | Wang et al. | |
| 2008/0003373 A1 | 1/2008 | Yan et al. | |
| 2008/0213473 A1 | 9/2008 | Roisin et al. | |
| 2009/0025777 A1 | 1/2009 | Varaprasad | |
| 2009/0220774 A1 | 9/2009 | Imai et al. | |

FOREIGN PATENT DOCUMENTS

JP    61108636    5/1986

OTHER PUBLICATIONS

English Abstract of JP-61108636, May 27, 1986.*

* cited by examiner

*Primary Examiner* — Alessandro Amari
*Assistant Examiner* — Kimberly N Kakalec
(74) *Attorney, Agent, or Firm* — Perkins Coie LLP.; Viola T. Kung

(57) ABSTRACT

An article comprising a substrate and an anti-reflection coating, and methods for depositing the coating, are disclosed. The coating comprises (a) a first coating layer having a high refractive index deposited on the substrate; (b) an epoxide-silica coating layer deposited onto the high refractive index coating layer, comprising an inorganic silica component and an organic organo-silicate component, and (c) a silica coating layer consisting essentially of silica, deposited directly onto the epoxide-silica coating layer. The anti-reflection coating optionally comprises a stack of coating layers, between the first high refractive index coating layer and the epoxide-silica coating layer, having alternating a low refractive index and a high refractive index. Individual coating layer compositions, refractive indexes, and thicknesses are carefully controlled such that reflectance is minimized through destructive interference in the visible light wavelength range of 400 to 700 nm. The resulting deposited coating provides excellent mechanical, chemical, and environmental durability.

23 Claims, 6 Drawing Sheets

DURABLE ANTI-REFLECTION COATINGS

This application is a continuation of PCT/US2010/052080, filed Oct. 8, 2010; which claims the priority of U.S. Provisional Application Nos. 61/250,206, filed Oct. 9, 2009. The contents of the above-identified applications are incorporated herein by reference in their entirety.

TECHNICAL FIELD

This invention relates generally to articles comprising a substrate and an anti-reflection coating deposited onto the substrate, and a process for depositing the anti-reflection coating onto the substrate. More particularly, this invention relates to an anti-reflection coating having improved mechanical, chemical, and environmental durability, and a process for depositing this coating onto transparent substrates such as polymeric or glass panels and ophthalmic lenses.

BACKGROUND OF THE INVENTION

Antireflection (AR) coatings on transparent articles reduce the reflectance of visible light from the articles and enhance the transmission of such light into, or through, the articles. When the articles are used as cover plates for display instruments, these coatings enhance the brightness, contrast, and readability of the displayed information, for a variety of lighting conditions. Optical articles such as ophthalmic lenses frequently are coated with antireflective coatings to decrease the level of reflected light and thereby increase visibility and minimize eye fatigue.

Anti-reflection (AR) coatings of various types and designs are well-known and used in a variety of applications. Some types of AR coatings comprise a single layer with refractive index lower than that of the substrate, or a stack of layers having alternating high and low refractive indexes. These coatings, while effective at reducing reflectivity, do not provide satisfactory durability for particularly harsh mechanical stress such as scratching or abrading, exposure to harsh chemicals such as acids or bases, and environmental conditions of temperature, humidity, sunshine or UV light exposure.

Some anti-reflection coatings comprise a single coating layer or film of material having an index of refraction lower than that of the transparent substrate material. Theoretically, a single layer coating having a refractive index equal to the square root of the refractive index of the substrate provides zero reflectance at a wavelength of light equal to four times the coating thickness. Magnesium fluoride ($MgF_2$) and fluoropolymers are common single-layer coating materials, as their relatively low refractive indexes (<1.40) can provide reasonable anti-reflective performance on a glass or polymer substrate having refractive index greater than about 1.50. Silicon dioxide (silica) is also used as a single-layer AR coating, although it provides only moderate anti-reflective performance, because its refractive index (about 1.46) tends to be closer to that of common transparent substrate materials.

Other anti-reflection coatings comprise a multi-layer stack having carefully controlled, alternating high and low relative refractive indexes, which when combined with prescribed thicknesses of each layer, results in destructive interference of reflected light and significantly greater reduction in reflectivity over the visible wavelength range of 400 to 700 nanometers (nm). Coatings of this kind may comprise, for example, alternating layers of titanium dioxide (titania) as the high refractive index layers, and silica as the low refractive index layers.

Some single-layer and multi-layer AR coatings contain nano-particles (such as silica) in one or more coating layers, which can improve anti-abrasion and anti-glare properties. These nano-particles, however, tend to increase the overall reflectance of the coated article across the entire visible spectrum, while creating a matte finish surface appearance. This matte finish is unacceptable for certain applications such as ophthalmic lenses.

While various single-layer and multi-layer anti-reflection coatings have been generally effective in providing the desired optical properties, the coatings are not considered to have been entirely satisfactory for use in many applications. For example, some of the coatings show low resistance to mechanical damage, either through applied abrasive force, which causes scratches in the coating or removal of coating from the surface, or through stresses caused by mismatched thermal expansion coefficients of coating and substrate materials, which causes micro-cracking or crazing of the coating. Other coatings, particularly those for which all the layers are deposited by techniques such as electron beam deposition, reactive plasma sputtering, and ion-assisted deposition, show low durability upon prolonged chemical or environmental exposure, which makes them less than ideal for long-term consumer use, for example, in ophthalmic lens applications.

It should, therefore, be appreciated that there is a need for improved antireflection coatings and for an improved process for depositing such coatings onto substrates such as transparent polymeric and glass panels, and polymeric ophthalmic lenses, wherein the deposited coatings provide a satisfactory combination of low reflectance in the visible wavelength range, and high levels of mechanical, chemical, and environmental durability. The present invention fulfills this need and provides further related advantages.

SUMMARY OF THE INVENTION

The present invention is directed to an article comprising a substrate and an anti-reflection coating deposited onto at least one main surface of the substrate The anti-reflection coating comprises three coating layers, (a) a first coating layer having a high refractive index deposited onto the substrate; (b) an epoxide-silica coating layer deposited onto the high-index coating layer, comprising a silicon dioxide component ($SiO_2$) and an organo-silicate component having the molecular formula $R_aSiO_{(4-a)/2}$, in a continuous cross-linked network, wherein R is an organic group that forms stable chemical bonds with silicon, and a is an integer between 1 and 3; and (c) a silica coating layer deposited directly onto the epoxide-silica coating layer, consisting essentially of silicon dioxide ($SiO_2$), wherein the silica coating layer is the outermost layer of the anti-reflection coating.

In a preferred embodiment, the anti-reflection coating of the article of the present invention further comprises a stack of coating layers having alternating a low refractive index and a high refractive index, deposited onto the first coating layer, such that the alternating layers are between the substrate and the epoxide-silica coating layer.

The present invention is also directed to a process for preparing the article comprising a substrate and an anti-reflection coating deposited onto at least one of its main surfaces. The process comprises the steps of, (a) applying a coating composition onto the substrate to deposit the first coating layer having high refractive index; (b) applying an epoxide-silica coating composition onto the first coating layer to deposit the epoxide-silica coating layer; (c) applying a silica coating composition directly onto the epoxide-silica layer to deposit the silica coating layer, wherein the silica coating layer is the outermost layer of the anti-reflection coating; and (d) curing each deposited layer after each step of depositing.

The substrate of the present invention may be any of various materials, shapes, and sizes. In preferred embodiments, the substrate is a transparent polymer or glass, in the shape of a flat or curved panel having two main surfaces, such as an ophthalmic lens. The article of the present invention exhibits reduced reflectivity of light within the visible wavelength range of 400 to 700 nm, along with excellent durability under severe mechanical, chemical, and environmental conditions, without suffering physical damage to the anti-reflection coating and without suffering degradation of its anti-reflective properties.

DETAILED DESCRIPTION OF INVENTION

Figure 1:
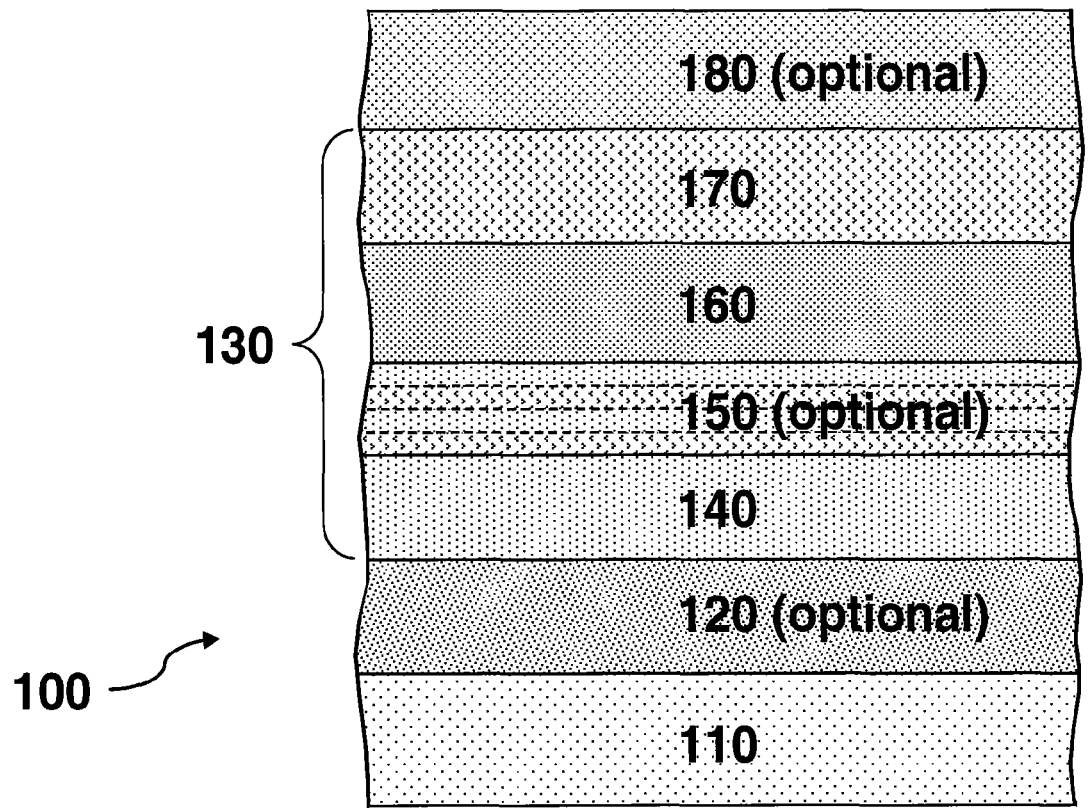
FIG. 1 is a schematic cross-sectional view, not to scale, of the article of the present invention, comprising a substrate with an anti-reflection coating deposited thereon.

The present invention is directed to an article comprising a substrate and an anti-reflection (AR) coating deposited onto at least one main surface of the substrate The anti-reflection coating comprises three coating layers, (a) a first coating layer having a high refractive index deposited onto the substrate; (b) an epoxide-silica coating layer deposited onto the high-index coating layer, comprising a silicon dioxide component ($SiO_2$) and an organo-silicate component having the molecular formula $R_a SiO_{(4-a)/2}$, in a continuous cross-linked network, wherein R is an organic group that forms stable chemical bonds with silicon, and a is an integer between 1 and 3; and (c) a silica coating layer deposited directly onto the epoxide-silica coating layer, consisting essentially of silicon dioxide ($SiO_2$), wherein the silica coating layer is the outermost layer of the anti-reflection coating.

In a preferred embodiment, the anti-reflection coating of the article of the present invention further comprises a stack of coating layers having alternating a low refractive index and a high refractive index, deposited onto the first coating layer, such that the alternating layers are between the first, high refractive index coating layer and the epoxide-silica coating layer.

The anti-reflection coating of the present invention provides optical properties comparable or superior to other known coatings, along with superior performance in terms of mechanical, chemical, and environmental durability. This combination of optical properties and durability performance is achieved through the deposition of three discrete coating layers onto the substrate.

The first coating layer deposited onto the substrate has a high refractive index. The primary function of the first layer having a high refractive index is to provide low reflectance over a broad wavelength range of the visible spectrum of light when combined with subsequent layers. An epoxide-silica coating layer is deposited onto the high refractive index coating layer. A silica coating layer is deposited directly onto the epoxide-silica coating layer. "Directly" means that, after depositing and curing the epoxide-silica coating layer, no other coating layers are deposited onto the epoxide-silica coating layer, before depositing the silica coating layer.

The epoxide-silica coating layer and the silica coating layer are deposited sequentially onto the substrate, that is, the silica coating layer is deposited directly onto the epoxide-silica coating layer, with no other coating layers between them, using the compositions described herein for each of the two discrete coating layers. The low refractive index of the epoxide-silica coating layer and silica coating layer combined with the high refractive index of the first layer provide low reflectance over a broad visible wavelength range. Moreover, the combination of the epoxide-silica coating layer and the silica coating layer placed directly on top of it, provides improved mechanical, chemical, and environmental durability compared to other types of anti-reflective coatings, and other arrangements of coating layers in an AR stack.

For example, the inventors have discovered that when the anti-reflection coating comprises the same three coating layers as above, but with the positions of the epoxide-silica coating layer and the silica coating layer reversed, the mechanical durability is substantially inferior to that of the invented AR coating. Also, if one or the other of either the epoxide-silica coating layer or the silica coating layer is omitted from the anti-reflection coating stack, the mechanical durability is again substantially inferior to that of the invented AR coating. Furthermore, if the silica coating layer is replaced by a different coating layer that may also comprise silica, but which falls outside of the definition of the preferred silica coating layer of the invention, the chemical durability of the AR coating is substantially inferior to that of the invented AR coating. Finally, if the epoxide-silica coating layer is replaced by a different coating layer that may also comprise silica and an organic component, but which falls outside of the definition of the preferred epoxide-silica coating layer of the invention, the mechanical and chemical durability of the AR coating is substantially inferior to those of the invented AR coating.

The present invention is also directed to a process for preparing the article comprising a substrate and an anti-reflection coating deposited onto at least one of its main surfaces. The process comprises the steps of, (a) applying a coating composition onto a substrate to deposit a first coating layer having high refractive index; (b) applying an epoxide-silica coating composition onto the first coating layer to deposit an epoxide-silica coating layer; (c) applying a silica coating composition directly onto the epoxide-silica layer to deposit a silica coating layer, wherein the silica coating layer is the outermost layer of the anti-reflection coating; and (d) curing each deposited layer after each step of depositing.

The substrate of the present invention may be any of various materials including metals, ceramics, glasses, and polymers. The substrate may be any of various shapes and sizes. Particularly suitable materials are light-transmitting substrates such as transparent glasses and polymers. Particularly suitable shapes include flat or curved panels having two main surfaces.

The substrate may be a transparent optical component such as a lens, prism, optical window, photomask substrate, pellicle used in photomask assemblies, and the like, that may be coated with the anti-reflection coating of the present invention to provide anti-reflective properties. A transparent substrate may also comprise a cover plate of a display device such as a field emission display, liquid crystal display (LCD), plasma display panel (PDP), electroluminescence display (ELD), cathode ray tube display (CRTs), fluorescence tube display, meter, clock, and the like, used in the manufacture of televisions, personal digital assistants (PDAs), cellular phones, vehicle dashboards, aeronautical instrument panels, projection screens, hand-held games, and the like.

The anti-reflection coating of the present invention is especially suitable for applications that require resistance to high mechanical stress (such as steel-wool abrasion), harsh chemicals (such as alkali solution or hot tap water), or environmental exposure (such as temperatures greater than 100° C., or long-term exposure to sunlight). One example of a particularly suitable use is as a coating for polymeric ophthalmic lenses.

As used in this application, "low refractive index" refers to refractive index higher than about 1.20, and lower than 1.60, preferably lower than 1.55, and more preferably lower than 1.51, at a wavelength of light of 510 nm. "High refractive index", as used in this application, refers to refractive index lower than about 2.40, and higher than 1.70, preferably higher than 1.80, and more preferably higher than 1.90, at a wavelength of light of 510 nm.

"About", as used in this application, refers to +/−10% of the recited value.

Also, as used in this application, "coating layer" refers to a single film of material deposited onto a substrate or onto other coating layers by applying a coating composition. Alternatively, "coating layer" may refer to multiple films of material all having similar high refractive index or all having similar low refractive index, deposited consecutively onto a substrate or other coating layers, by applying one or more similar coating compositions.

With reference now to the drawings, and particularly to FIG. 1, there is shown an article 100 that includes a substrate 110 and coating layers. The substrate may be of any shape, and it may be flat, or have curvatures. Preferably, the substrate has two main surfaces comprising most of its surface area, and an edge around its entire perimeter. The substrate may comprise polymer, glass, ceramic, metal, or a combination of these materials.

In a preferred embodiment, the substrate is a flat panel with two parallel or nearly parallel main surfaces. The panel may be any shape, i.e. oval, rectangular, triangular, etc. This embodiment is preferred for dip coating applications, as it facilitates a uniform coating thickness over both main surfaces. In another preferred embodiment, the substrate is a circular disc that may have a spherical, parabolic, or other type of curvature, such as a lens. This embodiment is preferred for spin coating applications.

In preferred embodiments, the substrate material comprises glass or polymer. Glass substrates may comprise, as examples, common silica-based glasses such as soda-lime, lead, borosilicate, aluminosilicate, lead borate, fused silica, or the like, or silica-free glasses such as fluoride, germanate, phosphate, or the like. Polymeric substrates may comprise, as examples, poly(methyl)methacrylate (PMMA), polycarbonate (PC), poly(ethylene terephthalate) (PET), polystyrene, poly(diethylene glycol-bis-allyl carbonate) (ADC) or CR-39®, triacetyl cellulose (TAC), poly(ethylene-2,6-naphthalate) (PEN), high-index resins such as MR-10, or the like. In one especially preferred embodiment, the substrate is a transparent polymeric ophthalmic lens.

On the substrate 110, it is optionally deposited a layer 120, which may comprise a primer coating layer, base coating layer, or hard coating layer. Optional layer 120 may also consist of two or more coating layers, for example, a primer coating layer deposited on the bare substrate, and a hard coating layer deposited on top of the primer, or a hard coating layer deposited on the bare substrate, and a primer coating layer deposited on the hard coating. Such primer coating, base coating, and hard coating formulations are commercially available, for example, from SDC Technologies Inc., Irvine, Calif., and Red Spot Corporation, Evansville, Ind. The primer coating and hard coating layers may be deposited by any of various methods such as dip-coating, spin-coating, roll-coating, flow-coating, meniscus coating, or spray-coating, provided that the method results in a smooth, uniform coating. The thicknesses of the primer, base coating, and hard coating layers are typically in the range of 1 to 10 micrometers, more preferably in the range of 2 to 6 micrometers. Primer and hard coating formulations may be of the UV radiation curable, IR radiation curable, or thermally curable variety. Before the deposition of a primer, base coating, or hard coating layer, the surface of the article may be modified by any of a number of well-known techniques such as corona discharge or chemical etching (particularly using a NaOH or KOH solution).

Figure 3:
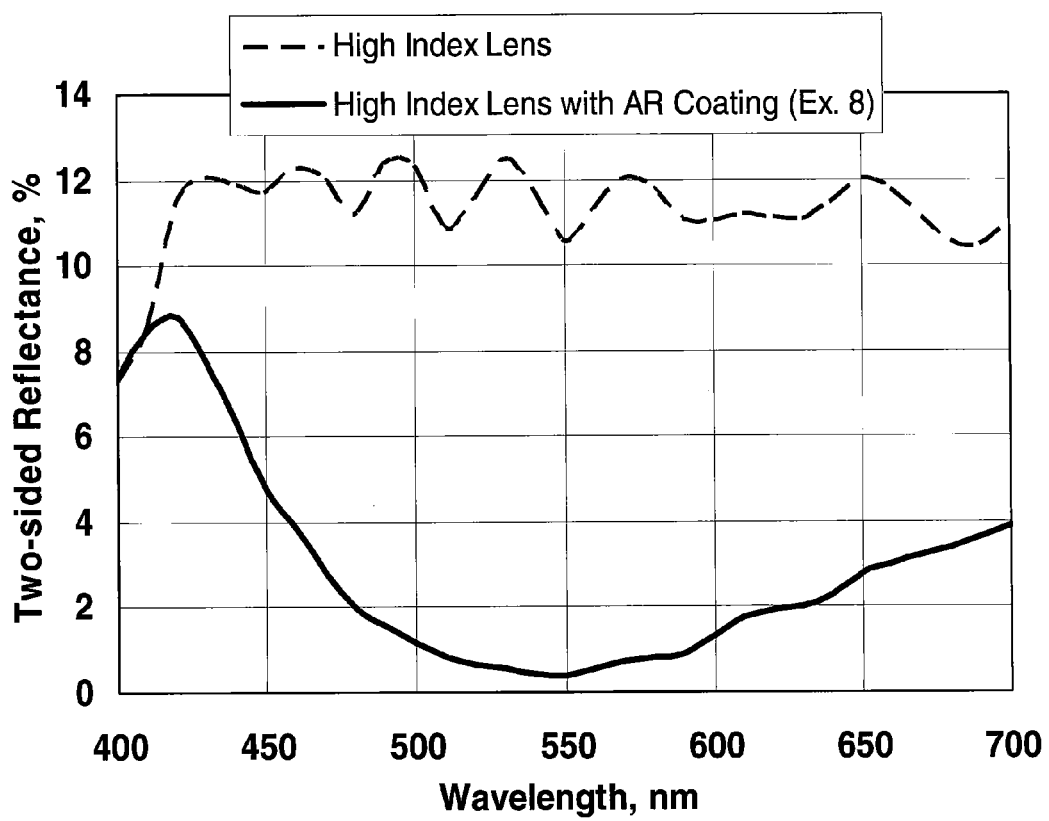
FIG. 3 is a graph of the reflectance of a high-index plastic ophthalmic lens over the wavelength range of 400 to 700 nm, both with and without an anti-reflection coating deposited in accordance with the present invention on both main surfaces, as described in Example 8.
Figure 4:
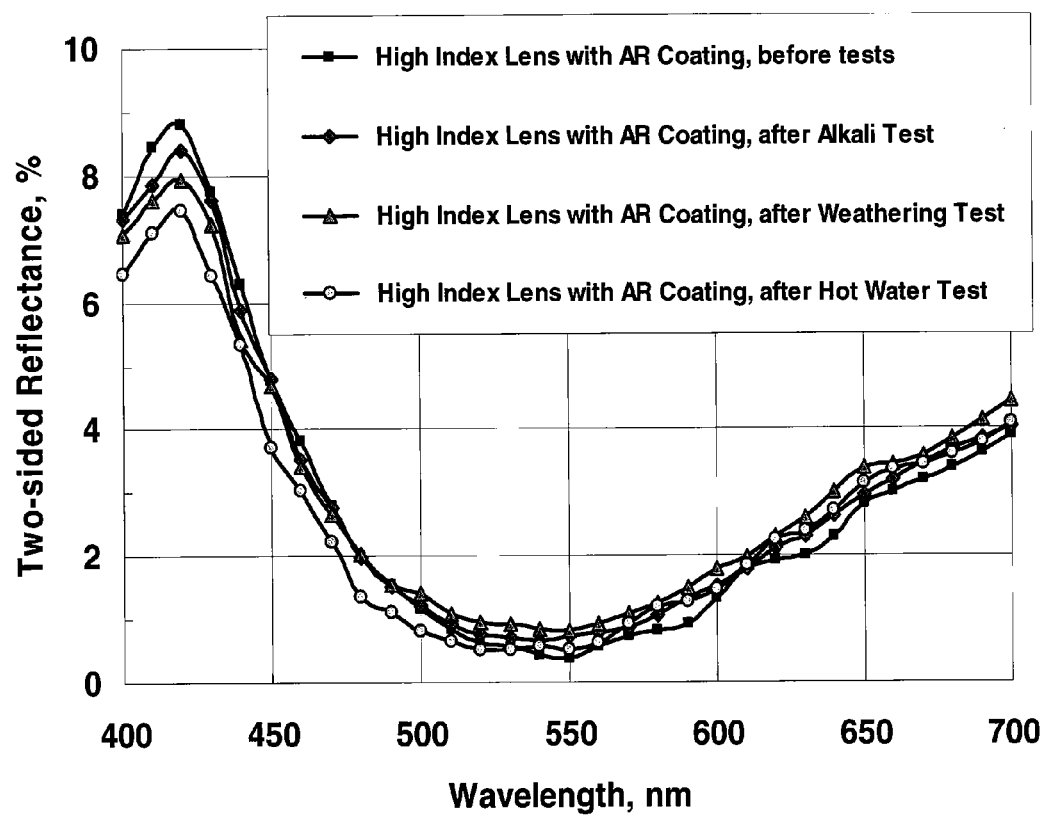
FIG. 4 is a graph of the reflectance of a high-index plastic ophthalmic lens over the visible wavelength range of 400 to 700 nm, with an anti-reflection coating deposited as described in Example 8, both before and after durability tests for chemical or environmental exposure.
Figure 6:
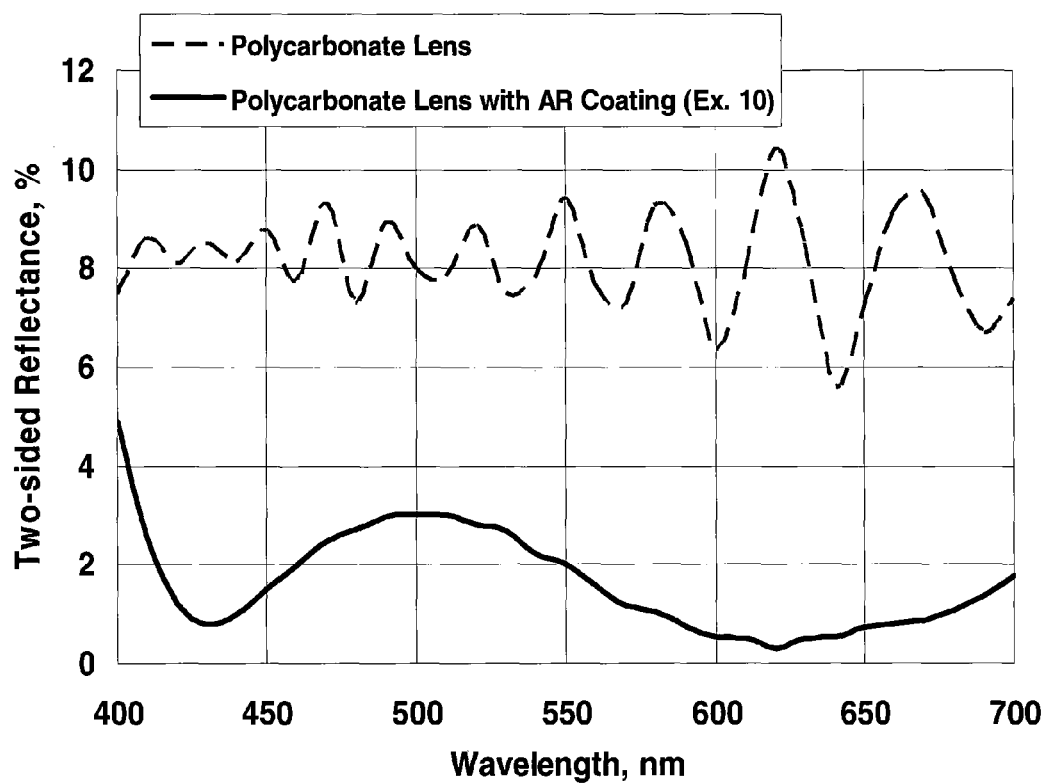
FIG. 6 is a graph of the reflectance of a polycarbonate ophthalmic lens over the wavelength range of 400 to 700 nm, both with and without an anti-reflection coating deposited in accordance with the present invention on both main surfaces, as described in Example 10.

On top of the optional layer 120, it is deposited an anti-reflection coating 130, that provides low reflectivity of light over the visible wavelength range of about 400 or 450 nanometers to about 700 nanometers (nm), and more specifically provides lowest reflectivity of light within the wavelength range of about 500 to about 600 nm. The two-sided reflectance of the article comprising the substrate with the anti-reflection coating deposited thereon, between about 500 and about 600 nm, is typically between 0 and about 4%, preferably between 0 and about 2%. The curve of reflectance vs. wavelength between 400 or 450 and 700 nm may take on any of various shapes that are well-known. As examples, the curve may be V-shaped or U-shaped, with a local minimum between about 500 and 600 nm (as shown in FIG. 3 and FIG. 4), or the curve may be W-shaped, with a local maximum between about 450 and about 600 nm (as shown in FIG. 6). For ophthalmic lenses, the W-shaped curve may be preferable, as this visible reflectance behavior usually provides a green, yellow, or neutral-colored hue to the reflectance, which are preferred for commercial ophthalmic use.

Before depositing the anti-reflection coating, the surface of the substrate, optionally pre-coated with primer, base coating, and/or hard coating layer(s), may be cleaned to remove airborne dust particles, dirt, residue of the manufacturing process, or any other foreign material on the surface by various standard techniques such as wiping with soft, non-abrasive cloths moistened with a solvent such as ethanol or 2-propanol, or by immersing the substrate in an ultrasonic detergent cleaning bath and rinsing with de-ionized water. After cleaning, the substrate may then be naturally air dried, or dried under a flow of air, either heated or unheated. An ionized air flow may also be applied to reduce static charge buildup on the surface of the substrate.

Before depositing the anti-reflection coating, the surface of the substrate, optionally pre-coated with primer, base coating, and/or hard coating layer(s), also may be modified by chemical etching or by corona discharge. This surface modification can increase the adhesion between the anti-reflection coating and the substrate or primer/base coating/hard coating layer(s) deposited on the substrate.

The anti-reflection coating 130 encompasses three or four layers: a coating layer 140 having a high refractive index, an optional layer 150, an epoxide-silica coating layer 160, and a silica coating layer 170, that is deposited directly on top of the epoxide-silica coating layer. "Directly" means that, after depositing and curing the epoxide-silica coating layers, no other coating layers are deposited onto the epoxide-silica coating layer, before depositing the silica coating layer.

Coating layer 140 is a coating layer having a high refractive index, that is, a refractive index higher than 1.70, preferably higher than 1.80, and more preferably higher than 1.90, at a wavelength of light of 510 nm.

Coating layer 140 may be comprised of any of various known materials typically employed as the high index layer(s) in an interference-type anti-reflection coating stack. Examples of such materials include titania ($TiO_2$), zirconia ($ZrO_2$), alumina ($Al_2O_3$), tantalum pentoxide ($Ta_2O_5$), and the like. The high refractive index layer may be deposited by any of various known techniques including vacuum deposition, sputtering, or by application of a liquid coating composition through dip coating, spin coating, etc.

Preferably, the high refractive index layer is deposited by applying a liquid coating composition. One method for depositing a coating by applying a liquid coating composition is the sol-gel coating method. In this method, an organometallic compound or metal alkoxide in a solvent solution is hydrolyzed and condensed in the presence of water and a catalyst, to form an oxide film on the substrate. The film may then be cured by application of heat, IR radiation, UV radiation, etc., which drives the condensation reactions towards completion and also makes the coating more dense. Any of various known organometallic compounds or metal alkoxides may be used as the precursor for the oxide coating. These precursors may also have additional organic functional groups such as epoxy groups, to provide organic cross-linking bonds within the coating, thereby improving its adhesion, mechanical properties, and compatibility with coating layers deposited on top of it. The solvent is usually one or more alcohols. The catalyst is usually an inorganic acid such as HCl or $HNO_3$.

In a preferred embodiment, coating layer 140 comprises $TiO_2$, which is formed by depositing and curing a coating composition comprising (a) a titanium alkoxide, such as titanium (IV) isopropoxide; (b) an epoxy-functional silicon alkoxide, such as (3-glycidoxypropyl)trimethoxysilane; (c) a non-epoxy-functional silicon alkoxide, such as tetramethyl orthosilicate, tetraethyl orthosilicate, or a combination thereof; (d) a curing agent compatible with epoxy-functional molecules, such as hexahydrophthalic anhydride or methylenesuccinic acid; (e) an acid such as nitric acid, hydrochloric acid, or a combination thereof; (f) a solvent such as ethyl alcohol, 1-methoxy-2-propanol, or a combination thereof; and (g) water.

Optional layer 150 comprises a stack of coating layers having alternating low refractive index and high refractive index. Layer 150 may have as many alternating coating layers as are deemed appropriate for the application; this is usually determined by the optical performance requirements. More alternating coating layers typically result in lower reflectance. However, there is usually a practical limit for the number of coating layers. As the stack builds up, interlayer adhesion may be reduced. Cost may also be a factor in deciding the optimum number of coating layers. In general, the optional layer 150, if present, has a total of between 2 and 12 alternating coating layers.

In one embodiment of the present invention, optional layer 150 is absent. In this embodiment, the anti-reflection coating 130 consists of three coating layers: high refractive index coating layer 140, epoxide-silica coating layer 160, and silica coating layer 170.

In another embodiment, layer 150 comprises two coating layers, the first coating layer having a low refractive index, which is deposited on the high refractive index coating layer 140, and the second coating layer having a high refractive index. In this embodiment, the anti-reflection coating 130 consists of five coating layers: high refractive index coating layer 140, layer 150 consisting of a stack of two coating layers, epoxide-silica coating layer 160, and silica coating layer 170.

High refractive index coating layers within layer 150 may be comprised of any of various known high index materials such as $TiO_2$, $ZrO_2$, $Al_2O_3$, $Ta_2O_5$, and the like, and may be deposited by any of various techniques including vacuum deposition, sputtering, or by liquid coating methods. Typically, the high refractive index coating layers within layer 150 are similar as to composition and deposition method to high refractive index coating layer 140. Preferably, the high refractive index coating layers are deposited by applying a liquid coating composition, more preferably a sol-gel type coating composition.

Low refractive index coating layers within layer 150 may be comprised of any of various known materials typically employed as the low refractive index layer(s) in an interference-type anti-reflection coating stack. Such materials may include silica ($SiO_2$), magnesium fluoride ($MgF_2$), fluorinated polymers, silicone-modified fluoropolymers, and the like. The low refractive index coating layers may be deposited by vacuum deposition, sputtering or preferably, by applying a liquid coating composition. In one embodiment, the low refractive index layers comprise silica deposited by applying a sol-gel type coating composition.

In a preferred embodiment, coating layers within layer 150 having a high refractive index comprise $TiO_2$, and coating layers within layer 150 having a low refractive index comprise $SiO_2$.

More preferably, coating layers within layer 150 comprising $SiO_2$ are deposited by applying and curing a coating composition comprising (a) a silicon alkoxide such as tetramethyl orthosilicate, tetraethyl orthosilicate, or a mixture thereof; (b) an acid such as nitric acid, hydrochloric acid, or a combination thereof; (c) a solvent such as ethyl alcohol, 1-methoxy-2-propanol, or a combination thereof; and (d) water, and coating layers comprising $TiO_2$ within layer 150 are deposited by applying and curing a coating composition comprising (a) a titanium alkoxide such as titanium (IV) isopropoxide, titanium propoxide, titanium ethoxide, and the like; (b) an acid such as nitric acid, hydrochloric acid, and the like, (c) an alcohol solvent; and (d) water.

In another preferred embodiment, coating layer 140 and high refractive index coating layers within layer 150 comprise $TiO_2$, and are deposited by applying and curing a coating composition comprising (a) titanium (IV) isopropoxide; (b) (3-glycidoxypropyl)-trimethoxysilane; (c) tetramethyl orthosilicate, tetraethyl orthosilicate, or a combination thereof; (d) hexahydrophthalic anhydride or methylenesuccinic acid; (e) nitric acid, hydrochloric acid, or a combination thereof; (f) ethyl alcohol, 1-methoxy-2-propanol, or a combination thereof; and (g) water.

High refractive index coating layer 140 and all coating layers within optional layer 150 may be deposited using any suitable known technique, by which each coating layer's thickness can be carefully controlled. Methods such as dip coating or spin coating may be especially suitable for applying the liquid-based sol-gel type coating compositions, to deposit the $TiO_2$ and $SiO_2$ coating layers.

In another preferred embodiment of the present invention, coating layer 140 comprises a $TiO_2$ coating layer, while optional layer 150 is absent. In another preferred embodiment, coating layer 140 comprises a $TiO_2$ coating layer, and optional layer 150 comprises one $SiO_2$ coating layer having a low refractive index, and one $TiO_2$ coating layer having a high refractive index.

Epoxide-silica coating layer 160 is a coating layer having a low refractive index, comprising two molecular components, (a) silicon dioxide ($SiO_2$) and (b) organo-silicate having the molecular formula $R_aSiO_{(4-a)/2}$, in a continuous cross-linked network, wherein R is an organic group that forms stable chemical bonds with silicon, and a is an integer between 1 and 3. The epoxide-silica coating layer 160 is deposited via a liquid-based coating process, by applying an epoxide-silica coating composition comprising (a) epoxy-functional silicon alkoxide, (b) non-epoxy-functional silicon alkoxide, (c) a curing agent compatible with epoxy-functional molecules, (d) acid, (e) solvent, and (f) water.

Silicon alkoxides may be generally described as compounds that contain silicon and one or more alkoxy groups. Suitable examples of an epoxy-functional silicon alkoxide include 2-(3,4-epoxycyclohexyl)ethyltriethoxysilane, epoxycyclohexyl)ethyltrimethoxysilane, 5,6-epoxyhexyltriethoxysilane, (3-glycidoxypropyl)dimethylethoxysilane, (3-glycidoxypropyl)methyldiethoxysilane, glycidoxypropyl) methyldimethoxysilane, (3-glycidoxypropyl)trimethoxysilane, glycidoxymethyltrimethoxysilane, 3-glycidoxypropyltriethoxysilane, mixtures thereof, and the like. In a preferred embodiment of the invention, the epoxy-functional silicon alkoxide is (3-glycidoxypropyl)trimethoxysilane. The amount of epoxy-functional silicon alkoxide in the epoxide-silica coating composition, in weight fraction relative to the total weight of all components in the composition, is between 0.0001 and 0.01, preferably between 0.0005 and 0.005, and more preferably between 0.001 and 0.002.

All subsequent ranges for components of the epoxide-silica coating composition are also provided in weight fraction relative to the total weight of all components in the composition, unless otherwise specified.

Suitable examples of a non-epoxy-functional silicon alkoxide include acetoxypropyltrimethoxysilane; (3-acryloxypropyl)trimethoxysilane; allyltrimethoxysilane; 3-aminopropyltrimethoxysilane; 3-aminopropyltris(methoxyethoxyethoxy)silane; 3-aminopropylmethyldiethoxysilane; 3-aminopropyldimethylethoxysilane; 3-aminopropyltriethoxysilane; 3-(N-allylamino)propyltrimethoxysilane; N-(2-aminoethyl)-3-aminopropyltrimethoxysilane; 2-cyanoethyltriethoxysilane; 3-cyanopropyltrimethoxysilane; (heptadecafluoro-1,1,2,2-tetrahydrododecyl)triethoxysilane; 3-mercaptopropyltrimethoxysilane; (3-methacryloxypropyl) trimethoxysilane; (3-methacryloxypropyl)triethoxysilane; methacryloxymethyltrimethoxysilane; methacryloxymethyltriethoxysilane; tetraethoxysilane (tetraethyl orthosilicate); tetramethoxysilane (tetramethyl orthosilicate); (tridecafluoro-1,1,2,2-tetrahydrooctyl)triethoxysilane; (3,3,3-trifluoropropyl)trimethoxysilane; vinyltrimethoxysilane; vinyltriethoxysilane; mixtures thereof; and the like. In one embodiment of this invention, the non-epoxy-functional silicon alkoxide is selected from the group consisting of tetramethoxysilane, tetraethoxysilane, and a combination of the two. In another embodiment, the non-epoxy-functional silicon alkoxide consists of tetramethoxysilane. The amount of non-epoxy-functional silicon alkoxide in the epoxide-silica coating composition is between 0.004 and 0.4, preferably between 0.01 and 0.1, and more preferably between 0.03 and 0.05.

The curing agent in the epoxide-silica composition may be any curing agent that is compatible with epoxy functional molecules. For example, the curing agent may be an anhydride, a carboxylic acid, mixtures thereof, and the like. Suitable examples of anhydrides are acetic anhydride, acrylic anhydride, cyclic anhydride, hexahydrophthalic anhydride, methacrylic anhydride, propionic anhydride, mixtures thereof and the like. Suitable carboxylic acid components include acetic acid, acrylic acid, formic acid, fumaric acid, maleic acid, methacrylic acid, propionic acid, methylenesuccinic acid, mixtures thereof, and the like. In one embodiment of the invention, the curing agent is selected from the group consisting of methylenesuccinic acid and hexahydrophthalic anhydride. In another embodiment, the curing agent is hexahydrophthalic anhydride. In yet another embodiment, the curing agent is methylenesuccinic acid. The amount of curing agent in the epoxide-silica coating composition is between 0.0001 and 0.01, preferably between 0.0005 and 0.005, and more preferably between 0.001 and 0.003.

Suitable examples of solvent in the epoxide-silica coating composition include methanol, ethanol, reagent-grade ethanol, propanol, isopropanol, butanol, isobutanol, secondary butanol, tertiary butanol, cyclohexanol, pentanol, octanol, decanol, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, tetrahydrofuran, dioxane, acetone, diacetone alcohol, methyl ethyl ketone, cyclohexanone, methyl isobutyl ketone, ethyl acetate, n-propyl acetate, n-butyl acetate, t-butyl acetate, propylene glycol monomethyl ether acetate, dipropylene glycol methyl ether acetate, 1-methoxy-2-propanol, ethyl 3-ethoxypropionate, 2-propoxyethanol, ethylene glycol ethyl ether acetate, mixtures thereof, and the like. The amount of the solvent in the epoxide-silica coating composition is between 0.7 and 0.999, preferably between 0.8 and 0.98, and more preferably between 0.87 and 0.95.

In one embodiment of the invention, the solvent is selected from the group consisting of reagent-grade ethanol, 1-methoxy 2-propanol, and the combination of the two. In a preferred embodiment, the solvent is a mixture of reagent-grade ethanol and 1-methoxy 2-propanol, with a weight fraction of reagent-grade ethanol relative to total solvent weight of between 0.2 and 1.0, preferably between 0.4 and 0.9, and more preferably between 0.4 and 0.6.

The inorganic acid useful to prepare the epoxide-silica coating composition may be any acid that can catalyze the hydrolysis and polymerization reactions of the epoxy-functional silicon alkoxide and the non-epoxy-functional silicon alkoxide. Suitable inorganic acids are hydrochloric acid, nitric acid, sulfuric acid, hydrofluoric acid, mixtures thereof, and the like. In one embodiment of the invention, the inorganic acid is nitric acid. The amount of inorganic acid in the epoxide-silica coating composition is between 0.0004 and 0.04, preferably between 0.001 and 0.01, and more preferably between 0.002 and 0.006.

The weight fraction of water in the epoxide-silica coating composition is between 0.005 and 0.10, preferably between 0.01 and 0.08, and more preferably between 0.02 and 0.06.

The relative amount of each component of the epoxide-silica coating composition, i.e., epoxy-functional silicon alkoxide, non-epoxy-functional silicon alkoxide, curing agent, solvent, inorganic acid, and water, is controlled such that when the epoxide-silica coating composition is deposited to form coating layer 160, the layer has a refractive index lower than 1.60, preferably lower than 1.55, and more preferably lower than 1.51, at a wavelength of about 510 nm. The preparation of the epoxide-silica coating composition is demonstrated by way of example in EXAMPLE 1, below. This epoxide-silica coating layer is deposited on top of coating layer 140, or on top of optional layer 150, using any suitable technique commonly known in the industry, such as dip coating or spin coating, by which its thickness can be carefully controlled.

The epoxide-silica coating layer is comprised of two molecular components in a continuous cross-linked network. The two molecular components both comprise silicon and oxygen. One of the molecular components is inorganic silicon dioxide, as $SiO_2$. The other molecular component is organo-silicate, which is a molecular component having both organic and inorganic constituents, and is described by the molecular formula $$R_a SiO_{(4-a)/2}$$

in which R is an organic group that forms stable chemical bonds with silicon in the deposited coating layer, and a is an integer from 1 to 3.

R's are independently selected from the group consisting of: alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenylaryl, and arylalkaryl, in which one or more hydrogens are optionally substituted with a functional group of epoxy, cyano, alkoxy, halogen, hydroxy, aryloxy, amino, amide, methacrylate, methacryloxy, mercapto, carbonyl, urethane, pyrrole, alkyl ester, aryl ester, carboxy, sulphonate, aminoacyl, acylamino, phosphonate, isothiouronium, thiouronium, or imidazole. Preferred functional groups are epoxy, cyano, alkoxy, aryloxy, halogen, amino, methacryloxy, and mercapto.

In a more preferred embodiment, the functional groups are epoxy. Epoxy functional groups provide especially strong bonds to silicon, improving the mechanical properties of the epoxide-silica coating layer and the entire anti-reflection coating. Epoxy groups also provide flexibility to the epoxide-silica coating layer, which helps counteract the effects of thermal expansion mismatch of the substrate material and inorganic oxide coating layers, which can cause crazing or cracking failure of the coating under temperature cycling stresses. Epoxy functional groups are also highly resistant to chemical damage, thus the epoxide-silica coating layer contributes as well to the improved chemical durability of the anti-reflection coating. Epoxy groups also facilitate rapid curing of the coating layer with application of heat, in the presence of a curing agent compatible with epoxy-functional molecules.

The inorganic silicon dioxide ($SiO_2$) component of the epoxide-silica coating layer is the hydrolyzed and condensed reaction product of a non-epoxy-functional silicon alkoxide. In one embodiment, the non-epoxy-functional silicon alkoxide is selected from the group consisting of tetramethoxysilane, tetraethoxysilane, tetra-n-propoxysilane, tetra-iso-propoxysilane, tetra-n-butoxysilane, tetra-sec-butoxysilane, tetra-tert-butoxysilane, and tetraphenoxysilane. In a preferred embodiment, the silicon alkoxide is selected from the group consisting of tetramethoxysilane, tetraethoxysilane, and a combination of the two.

The organo-silicate component of the epoxide-silica coating layer is the hydrolyzed, condensed, and cured reaction product of a functional silicon alkoxide, including an epoxy functional silicon alkoxide and a non-epoxy functional silicon alkoxide. Suitable examples of functional silicon alkoxides include 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)dimethylethoxysilane, (3-glycidoxypropyl)methyldiethoxysilane, glycidoxypropyl)methyldimethoxysilane, (3-glycidoxypropyl)trimethoxysilane, glycidoxymethyltrimethoxysilane, 3-glycidoxypropyltriethoxysilane, 3-cyanopropyltrimethoxysilane, mixtures thereof, and the like. In a preferred embodiment of the invention, the epoxy-functional silicon alkoxide is (3-glycidoxypropyl)trimethoxysilane.

The ratio of the inorganic $SiO_2$ component and the organic organo-silicate component in the epoxide-silica coating layer is not particularly limited, but is generally between 1:1 and 100:1 in terms of molar ratio of inorganic $SiO_2$:organo-silicate component. Preferably, this ratio is between 6:1 and 60:1, and more preferably, this ratio is between 14:1 and 24:1. In one embodiment, this ratio is about 19:1.

The weight percent of inorganic $SiO_2$ component in the epoxide-silica coating layer is typically greater than 50 and less than 100, preferably between 60 and 95, more preferably between 80 and 90. The weight percent of the organic organo-silicate component in the epoxide-silica coating layer is typically greater than 0 and less than 50, preferably between 0 and 20, and more preferably between 2 and 8.

The epoxide-silica coating layer may additionally comprise a hardener component. The hardener is generally of the same molecular structure as the curing agent in the epoxide-silica coating composition. The hardener bonds to the organic groups in the organo-silicate component of the coating and becomes a part of the continuous network of the coating. Typically, the weight percent of hardener in the epoxide-silica coating layer is between 0 and 20, preferably between 4 and 14, and more preferably between 6 and 12.

Silica coating layer 170 within anti-reflection coating 130 is a coating layer having low refractive index, comprising silicon dioxide. In one embodiment of the present invention, coating layer 170 is deposited by applying and curing a composition comprising a silicon alkoxide such as tetramethyl orthosilicate; an inorganic acid such as nitric acid, a solvent such as ethyl alcohol, 1-methoxy-2-propanol, or a mixture thereof; and water.

In a preferred embodiment, coating layer 170 is deposited by applying and curing a composition comprising (a) a silicon alkoxide selected from the group consisting of tetraethyl orthosilicate, tetramethyl orthosilicate, or a combination thereof; (b) hydrochloric acid, nitric acid, or a combination thereof; (c) ethyl alcohol, 1-methoxy-2-propanol, or a combination thereof; and (d) water; wherein the coating composition does not contain any other silicon alkoxide.

The silica coating layer, which is deposited directly onto the epoxide-silica coating layer, consists essentially of silica (silicon dioxide, i.e. $SiO_2$) as a continuous network. Typically, the silica in the silica coating layer is the hydrolyzed and condensed reaction product of a non-epoxy-functional silicon dioxide. In one embodiment, the non-epoxy-functional silicon alkoxide is selected from the group consisting of tetramethoxysilane, tetraethoxysilane, tetra-n-propoxysilane, tetra-iso-propoxysilane, tetra-n-butoxysilane, tetra-sec-butoxysilane, tetra-tert-butoxysilane, and tetraphenoxysilane. In a preferred embodiment, the silicon alkoxide is selected from the group consisting of tetramethoxysilane, tetraethoxysilane, and a combination of the two.

In an especially preferred embodiment, silica in the silica coating layer is the reaction product of a silicon alkoxide of tetramethoxysilane (TMOS). TMOS is a highly reactive silicon alkoxide because of the four short methoxy groups bonded to each silicon atom. The reactivity of the silicon alkoxides generally decreases with the length of the alkoxy chains, and the methoxy group has the shortest possible chain of one carbon atom. The hydrolysis and condensation of TMOS can be driven substantially farther through acid catalysis and subsequent thermal curing, compared to the reactions of other alkoxides. This provides a harder, more rigid, and more dense silica coating layer, which thereby improves the durability properties of the entire anti-reflection coating stack.

To achieve the desired improvement in durability of the anti-reflection coating, silica coating layer 170 is essentially free of organic component in the silica network. Organic groups tend to soften a coating layer and increase its flexibility; these features are desirable for the epoxide-silica coating layer, to improve interlayer adhesion, reduce thermal mismatch, and improve chemical resistance. However, for the AR coating to achieve excellent mechanical durability, and especially, resistance to severe mechanical stresses such as steel wool abrasion testing, the outermost silica coating layer in the present invention is a hard, rigid coating layer. The presence of organic groups reduces these properties.

Also, silica coating layer 170 is essentially free of other inorganic materials such as metals or metal oxides. The presence of metallic species unacceptably reduces transmittance and thereby spoils the anti-reflective properties of the coating. Metal oxides change the refractive index of the coating layer, also detrimentally affecting the optical properties. Metal oxide impurities also change the structure of the continuous network, such that the mechanical properties will be affected unfavorably.

Coating layer 170 is deposited directly on top of the epoxide-silica coating layer 160, using any suitable technique commonly known in the industry, such as dip coating or spin coating, by which its thickness can be carefully controlled.

On top of anti-reflection coating 130, it is optionally deposited a hydrophobic layer 180. This hydrophobic layer is deposited by applying and optionally curing a hydrophobic treatment composition. Any of various known hydrophobic or as sometimes referred to, anti-fouling treatments may be used. In one embodiment, the hydrophobic treatment is accomplished using a composition comprising an organosilane such as 1H,1H,2H,2H,-perfluorodecyltriethoxysilane; an acid catalyst such as hydrochloric acid; a first solvent such as deionized water; a second solvent such as ethylene glycol; and a third solvent such as 2-propanol, by a process such as is disclosed in U.S. Pat. No. 6,395,331 to Yan et al., the contents of which are incorporated herein by reference. The hydrophobic layer provides the coating stack with moisture-repelling, anti-smudge, and anti-fingerprint characteristics. Hydrophobic layer 180 is deposited using any suitable technique such as dip coating or spin coating. The thickness of the hydrophobic layer typically ranges from a few molecular layers (that is, <1 nm) to about 10 nm.

In one embodiment of the invention, the layers within anti-reflection coating 130 are deposited onto the article by spin-coating. In the spin-coating technique, the article is secured firmly on the surface of a rotating chuck by application of vacuum. A predetermined volume of the liquid coating composition is dispensed onto the article surface, while it is being rotated, typically at speeds higher than 500 rpm. The coating composition thereby forms a thin layer or film on the article surface and may be partially dried during spinning. The article then may be thermally cured on the chuck by, for example, flowing hot air from a heat gun. Alternatively, the article may be removed from the spin-coating apparatus and cured, for example, in an oven. Typically, just one main surface of the article is coated by the spin-coating technique during each anti-reflection coating sequence.

For all suitable coating techniques, the reflectance of the destructive interference-type anti-reflection coating depends on the refractive index and thickness of each layer. Appropriate refractive indexes and thicknesses for each coating layer, that will provide the desired anti-reflective properties in the coating, may be determined using a commercial computer software application for coating stack design such as FILMSTAR (FTG Software Associates, Princeton, N.J.).

The composition of the coating solution affects both its refractive index and its deposited thickness. The speed at which the article is rotated and the viscosity of the composition also affect the thickness of the deposited coating layer. Coating layer thickness decreases as spin-speed increases and composition viscosity decreases. The spin-speed of the spin-coater for each layer of the anti-reflection coating stack that yields the desired reflectance may be determined empirically by preparing a number of coatings, each having an anti-reflection coating layer deposited at a different spin speed, and by then measuring the anti-reflective property of each coating. The spin speeds for each layer that yield the best overall anti-reflective property are then selected to produce the anti-reflection coating.

The thickness range for each of high-index coating layer 140, epoxide silica coating layer 160, and silica coating layer 170 is typically from about 10 to about 200 nm.

In one embodiment, the thickness of high-index coating layer 140 is between about 20 and about 40 nm, the thickness of epoxide silica coating layer 160 is between about 55 and about 75 nm, and thickness of silica coating layer 170 is between about 40 and about 60 nm. In this embodiment, optional layer 150 is absent.

In another embodiment, the thickness of high-index coating layer 140 is between about 30 and about 50 nm, the thickness of epoxide silica coating layer 160 is between about 60 and about 80 nm, and thickness of silica coating layer 170 is between about 20 and about 40 nm. In this embodiment, the sum of the thicknesses of coating 160 and coating layer 170 is between about 90 nm and about 110 nm. Also in this embodiment, optional layer 150 is present, and consists of one low refractive index coating layer and one high refractive index coating layer. In this embodiment, the one low refractive index coating layer within layer 150 has a thickness between about 10 and about 30 nm, and the one high refractive index coating layer within layer 150 has a thickness between about 45 and about 65 nm.

Each deposited coating layer within the anti-reflection coating of the present invention is thermally cured by heat treatment under selected conditions of temperature and time that do not physically or chemically degrade the coating and/or the article. For example, if the substrate is a polymer, and its heat deformation temperature is exceeded during the coating process, the article may deform, rendering it useless for commercial purposes. At temperatures much higher than the heat deformation temperature, the article may even chemically decompose, although such physical or chemical degradation may be avoided by shortening the heat treatment time. Thus, negative effects of higher heat treatment temperatures may be avoided by shortening the process time. The heat treatment temperatures and time durations that yield the best curing conditions, and accordingly the best coating properties such as mechanical, chemical, and environmental durability, while avoiding substrate degradation, may be determined empirically.

This anti-reflection coating 130 also provides improved mechanical, chemical, and environmental durability to the article of the present invention. These improved properties are realized when the coating layers are deposited on the substrate in certain sequences, by applying the coating compositions described herein. The improved properties are manifest by the absence of any detectable damage to the coating after the exposure, or a reduction in the amount of detectable damage to the coating after exposure, when compared to other known types of anti-reflection coatings or to configurations of coating layers outside the scope of the invention.

Detectable damage may be in the form of, for example, delamination of the coating, loss of adhesion of the coating to the substrate, partial removal of the coating, spots, pinholes, or other visible defects in the coating, or reduced optical performance as determined by, for example, analysis of the reflectance of the article over the visible wavelength range of 400-700 nm, using an instrument such as a model ULTRASCAN XE spectrophotometer manufactured by Hunter Associates Laboratory, Inc. (Reston, Va.).

The improved properties include significantly improved resistance to environmental exposure. For example, the article of the present invention shows improved resistance to high temperature exposure. With the deposited anti-reflection coating, the article typically shows resistance to temperatures of greater than 100° C., often shows resistance to temperatures of greater than 115° C., and may show resistance to temperatures of at least 130° C., when exposed for up to 30 minutes.

Another example of improved environmental properties is shown by the article's resistance to weathering, when subjected to testing in a weathering equipment such as a Model CXWA Sunshine Carbon Arc WEATHER-OMETER® manufactured by Atlas Material Testing Technology LLC, Chicago, Ill. The article shows improved resistance to combined exposure to simulated sunlight, high temperature, and humidity, at temperatures of up to 60° C. for exposure times of up to 120 hr.

The improved properties also include resistance to chemical exposure. For example, the article with the anti-reflection coating shows improved resistance to exposure to hot water at a temperature of up to 90° C., when exposed for up to 90 minutes. Also, the article shows improved resistance to exposure to a 0.1 N solution of sodium hydroxide (NaOH). The article typically resists exposure at room temperature to such an NaOH solution for up to 30 minutes.

The improved properties also include resistance to mechanical damage. Such damage may occur spontaneously, due to stresses during the coating and curing processes, or it may occur as a result of evaluation tests. A typical test is performed by applying steel wool to the article with a given force in a reciprocating motion for a given number of cycles. The article with the anti-reflection coating showed improved resistance both to stresses of the coating and curing processes, and to the application of steel wool (type 0000) with a force of up to 1 kg for up to 10 cycles.

The substance and method of the present invention may be better understood by reference to the following illustrative examples:

EXAMPLES

Example 1

Preparation of an Epoxide-Silica Coating Composition (OS)

A low refractive index, epoxide-silica coating composition, designated as the "OS" composition, was prepared as follows:

In a closed plastic container, about 368.2 grams of reagent-grade ethanol (Fisher Chemical Co., catalog No. A995-4), about 77.5 grams of deionized water, about 8.6 grams of nitric acid (about 70 wt % $HNO_3$) (Fisher Chemical Co., catalog No. A200-500) and about 1.0 grams of sodium acetate (Sigma Aldrich, catalog No. 470899) were mixed using a magnetic stirring plate, for about 30 minutes at about 350 rpm and at 65° C., to form a first mixture. Then, about 81.8 grams of tetramethyl orthosilicate (a non-epoxy-functional silicon alkoxide, Sigma Aldrich, catalog No. 218472) were added to the first mixture, to form a second mixture. The second mixture was stirred for about 2 hours, at about 350 rpm and at 65° C. Then, about 497.3 grams of reagent-grade ethanol and 865.5 grams of 1-methoxy-2-propanol (Sigma Aldrich, catalog No. 484407) were added to the second mixture, to form a third mixture. The third mixture was stirred for about 2 hours, at about 350 rpm and at ambient temperature.

A fourth mixture was prepared by stirring a separate mixture containing about 2.4 grams of (3-glycidoxypropyl)trimethoxysilane (an epoxy-functional silicon alkoxide, Sigma Aldrich, catalog No. 440167), about 3.31 grams of methylenesuccinic acid (Sigma Aldrich, catalog No. 129204), and about 10.8 grams of reagent-grade ethanol. The fourth mixture was mixed for about 10 minutes at about 300 rpm and at 45° C. About 1.1 grams of deionized water was added to the fourth mixture to form a fifth mixture, and this fifth mixture was stirred for about 60 minutes, at about 300 rpm and at 45° C. Then, about 35.8 grams of reagent-grade ethanol, and about 46.6 grams of 1-methoxy-2-propanol were added to the fifth mixture, to form a sixth mixture. The sixth mixture was stirred for about 2 hours, at about 350 rpm and at ambient temperature.

The sixth mixture was added to the container containing the third mixture to form a seventh mixture. After the seventh mixture was stirred for about 15 hours, at about 300 rpm and at ambient temperature, it was filtered through a 0.2-μm filter, to form the OS coating composition.

Example 2

Preparation of a Low Refractive Index Silica Coating Composition (DS2)

This low-refractive index silica coating composition, designated as the "DS2" composition, was prepared as follows:

In a closed plastic container, about 199.7 grams of reagent-grade ethanol, about 46.0 grams of deionized water, about 5.1 grams of nitric acid (70 wt %), and about 0.6 grams of sodium acetate were mixed for about 30 minutes, at about 350 rpm and at 65° C., to form a first mixture. Then, about 48.6 grams of tetramethyl orthosilicate (a silicon alkoxide) were added to the first mixture, to form a second mixture. The second mixture was stirred for about 2 hours, at about 350 rpm and at 65°

C. Then, about 684.9 grams of reagent-grade ethanol and 1015.1 grams of 1-methoxy-2-propanol were added to the second mixture, to form a third mixture. After stirring the third mixture for about 15 hours at about 350 rpm and at ambient temperature, it was filtered through a 0.2-μm filter, to form the DS2 coating composition.

Example 3

Preparation of a High Refractive Index Titania Coating Composition (HT1)

The preparation of this high-refractive index coating composition, designated as the "HT1" composition, was described in detail in US Patent Application US 2008/0003373 A1 to Yan et al, the contents of which are incorporated by reference.

In a closed plastic container, about 317.1 grams of reagent-grade ethanol, about 5.9 grams of hydrochloric acid (about 36 wt % HCl) (Fisher Chemical, catalog No. A508-500), and about 5.7 grams of deionized water were mixed for about 5 minutes using a magnetic stirrer, at about 200 rpm and at ambient temperature, to form a first mixture. Then, about 106.4 grams of titanium(IV) isopropoxide (Sigma Aldrich, catalog No. 205273) were added to the first mixture, to form a second mixture, and this second mixture was stirred for about 60 minutes, at about 200 rpm and at ambient temperature. Then, about 1552.5 grams of reagent-grade ethanol, about 2.1 grams of hydrochloric acid, and about 10.4 grams of deionized water were added to the second mixture, to form a third mixture.

A fourth mixture was prepared by stirring a mixture containing about 1.34 grams of (3-glycidoxypropyl)trimethoxysilane, an epoxy-functional silicon alkoxide, about 1.70 grams of methylenesuccinic acid (a curing agent), about 1.58 grams of tetramethyl orthosilicate (a non-epoxy-functional silicon alkoxide, about 1.98 grams of 1-methoxy 2-propanol, about 1.4 grams of water, and about 32 grams of reagent-grade ethanol for about 1 hour, at about 250 rpm and at ambient temperature.

A fifth mixture was prepared by adding the fourth mixture to the third mixture. After the fifth mixture was stirred for about 5 hours, at about 200 rpm and at ambient temperature, it was filtered through a 0.2-μm filter, to form the HT1 coating composition.

Example 4

Preparation of a Hydrophobic Coating Composition (HP)

The preparation of a hydrophobic coating composition used to deposit a hydrophobic layer was described in detail in U.S. Pat. No. 6,395,331 to Yan et al. The hydrophobic coating composition, referred to as the "HP" composition, was prepared in a two-step procedure. First, in a plastic container, about 38.5 grams of 2-propanol (Fisher Chemical, catalog No. A416-4), about 2.8 grams of deionized water, about 0.7 gram of hydrochloric acid (36 wt %), and about 0.4 grams of 1H,1H,2H,2H,-perfluorodecyltriethoxysilane (Sigma Aldrich, catalog No. 658758) were mixed together, to form a first mixture. This first mixture was stirred for about 2 hours at about 250 rpm, at ambient temperature. The first mixture was then mixed with about 0.1 gram of 1H,1H,2H,2H,-perfluorodecyltriethoxysilane, about 495.3 grams of deionized water, about 418.3 grams of 2-propanol, and about 44 grams of ethylene glycol (Sigma Aldrich, catalog No. 293237), to form a second mixture. The second mixture was stirred at about 250 rpm for about 1 hour and then filtered through a 0.2-μm filter to produce the "HP" hydrophobic coating composition.

Example 5

Preparation of a High Refractive Index Titania Coating Composition (HT3)

The preparation of a similar high-refractive index coating composition, designated as the "HT3" composition, was described in detail in U.S. Patent Application US 2008/0003373 A1 to Yan et al.

In a closed plastic container, about 373.6 grams of reagent-grade ethanol, about 11.5 grams of hydrochloric acid (about 36 wt % HCl), and about 5.3 grams of deionized water were mixed for about 5 minutes using a magnetic stirrer, at about 200 rpm and at ambient temperature, to form a first mixture. Then, about 141.5 grams of titanium(IV) isopropoxide were added to the first mixture, to form a second mixture, and this second mixture was stirred for about 60 minutes, at about 200 rpm and at ambient temperature. Then, about 656.4 grams of reagent-grade ethanol, about 6.2 grams of hydrochloric acid, and about 20.8 grams of deionized water were added to the second mixture, to form a third mixture.

A fourth mixture was prepared by stirring a mixture containing about 1.8 grams of (3-glycidoxypropyl)trimethoxysilane, about 2.4 grams of methylenesuccinic acid, about 2.3 grams of tetramethyl orthosilicate, about 2.7 grams of 1-methoxy 2-propanol, about 2.0 grams of deionized water, and about 42.6 grams of reagent-grade ethanol for about 1 hour, at about 250 rpm and at ambient temperature.

A fifth mixture was prepared by combining the fourth mixture and the third mixture, and adding an additional 731.0 grams of reagent-grade ethanol. After the fifth mixture was stirred for about 5 hours, at about 200 rpm and at ambient temperature, it was filtered through a 0.2-μm filter, to form the HT3 coating composition.

Example 6

Preparation of a Low Refractive Index Silica Coating Composition (LS2)

This low refractive index silica coating composition is designated as the "LS2" composition. Preparation of the LS2 composition is described in detail in U.S. Pat. No. 5,856,018 to Chen et al, the contents of which are incorporated herein by reference. The LS2 coating composition was prepared as follows: In a plastic container, about 28.3 grams of reagent-grade ethanol, about 52.6 grams of tetraethyl orthosilicate (Sigma Aldrich, catalog No. 131903), about 2.6 grams of hydrochloric acid (36 wt %), and about 15.3 grams of deionized water were mixed for about 30 minutes, at about 200 rpm and at ambient temperature, to form a first mixture. Then, about 901.2 grams of reagent-grade ethanol were added to the first mixture, to form a second mixture. After the second mixture was stirred for about 5 hours, at about 200 rpm and at ambient temperature, it was filtered through a 0.2-μm filter, to form the LS2 coating composition.

Example 7

Preparation of a Low Refractive Index Polysiloxane Coating Composition (DXS)

This low refractive index polysiloxane coating composition is designated as the "DXS" composition. The DXS composition was prepared as follows: In a container, about 151 grams of a thermally curable coating composition purchased from SDC Technologies, Inc., Irvine, Calif. under a catalog number MP-1154D, about 277 grams of 1-methoxy-2 propanol, and about 1572 grams of 2-propanol, were combined to form a mixture. This mixture was stirred at about 250 rpm for about 60 minutes, in ambient conditions. The mixture then was filtered through a 10-μm filter, to form the DXS coating composition.

Example 8

AR Coating on a High-Index Plastic Ophthalmic Lens (Invention)

An anti-reflection coating consisting of three discrete coating layers was deposited on one side of a Seiko Epson high-index plastic ophthalmic lens, by a conventional spin-coating process, using the Gerber Coburn Stratum Lens Coating System.

Before deposition of the AR coating, the lens was cleaned with an ethanol-moistened clean room cloth, and then dried by blowing with compressed air, and then corona treated for about 10 seconds.

A first coating layer was deposited on the lens surface using the HT1 composition described in Example 3. The composition was applied by manually dispensing 0.5 to 1.0 ml of composition onto the surface, over a duration of less than two seconds, while the lens was rotated at a speed of about 3500 rpm. After dispensing the composition, lens rotation was continued for about an additional 15 seconds. This first coating layer was cured at about 120° C. for about 30 minutes in an oven. The surface with the first coating layer deposited on it was then treated by corona treatment for about 10 seconds.

A second coating layer was then deposited on top of the HT1 layer using the OS composition described in Example 1. The composition was applied by manually dispensing 0.5 to 1.0 ml of composition onto the surface, over a duration of less than two seconds, while the lens was rotated at a speed of about 1200 rpm. After dispensing the composition, lens rotation was continued for about an additional 15 seconds. This second coating layer was cured at about 120° C. for about 30 minutes in an oven. The lens surface with the first and second coating layers deposited on it was then treated by corona treatment for about 10 seconds.

A third coating layer was then deposited on top of the OS layer using the DS2 composition described in Example 2. The composition was applied by manually dispensing 0.5 to 1.0 ml of composition onto the surface, over a duration of less than two seconds, while the lens was rotated at a speed of about 2700 rpm. After dispensing the composition, lens rotation was continued for about an additional 15 seconds. This third layer was cured at about 100° C. for about 30 minutes in an oven.

Finally, a hydrophobic layer was deposited onto the DS2 layer using the hydrophobic coating composition described in Example 4. The liquid composition was applied by manually dipping the lens into the composition for about 10 seconds. The hydrophobic coating layer was cured by heating for about 6 hours at about 100° C. in an oven.

Figure 2:
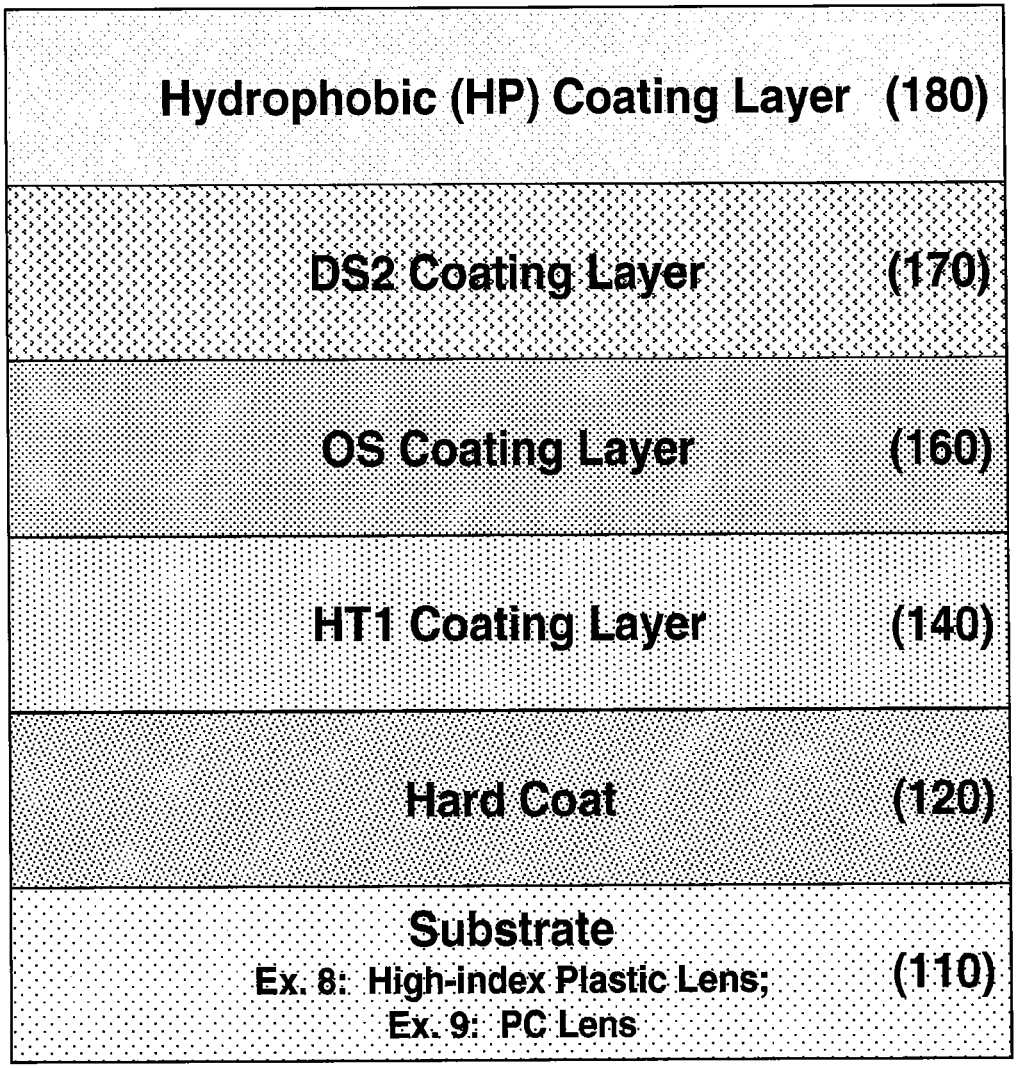
FIG. 2 is a schematic cross-sectional view, not to scale, of a substrate with an anti-reflection coating deposited thereon, as described in Examples 8 and 9.

The AR coating deposited in this example is depicted schematically in FIG. 2, deposited onto a substrate comprising a high-refractive index ophthalmic lens. Thicknesses and refractive indexes of each coating layer were determined using a spectroscopic ellipsometer manufactured by J.A. Woollam Co., Inc. (Lincoln, Nebr.) under the catalog name VASE®. The layer of the coating deposited using the HT1 composition yielded a refractive index of about 2.0. The thickness of this layer was about 24 nm. The next layer of the coating, deposited using the OS composition, yielded a refractive index of about 1.50. The thickness of this layer was about 65 nm. The next layer of the coating, deposited using the DS2 composition, yielded a refractive index of about 1.46. The thickness of this layer was about 48 nm. The reflectance of a lens coated on both main surfaces over the wavelength range of 400 to 700 nm was measured using the Hunter Ultrascan XE spectrophotometer. The anti-reflective properties of the coating are shown in FIG. 3.

The mechanical, chemical, and environmental durability of the coating were evaluated as described in Example 17. The AR coating applied as described in this example on a high-index lens passed all durability tests. Furthermore, as shown in FIG. 4, the optical properties (i.e. reflectance) of the coated lens were not degraded by chemical or environmental exposure during the tests.

Example 9

AR Coating on a Polycarbonate Ophthalmic Lens (Invention)

An anti-reflection coating was deposited as described in Example 8, except the coating was deposited on the surface of a polycarbonate (PC) ophthalmic lens. The lens was purchased from Essilor Corporation under the trademark AIR-WEAR®, and as purchased, had a hard coat on both main surfaces.

After depositing the AR coating, a hydrophobic HP layer was deposited on the surface as also described in Example 8. The AR coating deposited in this example is depicted schematically also in FIG. 2, deposited onto a substrate comprising a PC ophthalmic lens. A PC lens with the AR coating applied to both main surfaces as described in this example showed low (<2%) reflectance of light within the wavelength range of 500 to 600 nm, i.e. its optical properties were similar to those of the high-index lens with the AR coating applied as described in Example 8.

The mechanical, chemical, and environmental durability of the coating were evaluated as described in Example 17. The AR coating applied as described in this example on a polycarbonate ophthalmic lens passed all durability tests.

Example 10

AR Coating on a Polycarbonate Lens (Invention)

An anti-reflection coating consisting of five discrete coating layers was deposited on one side of an Essilor AIR-WEAR® polycarbonate (PC) ophthalmic lens, by a conventional spin-coating process, using the Gerber Coburn Stratum Lens Coating System.

The lens was prepared for deposition of the AR coating by wiping with an ethanol-moistened clean room cloth, then blowing with compressed air, and then by corona treating the surface for about 10 seconds.

A first coating layer was deposited on the lens surface using the HT3 composition described in Example 5. The composition was applied by manually dispensing 0.5 to 1.0 ml of composition onto the surface, over a duration less than two seconds, while the lens was rotated at a speed of about 3500 rpm. After dispensing the composition, lens rotation was continued for about an additional 15 seconds. This first coating layer was cured at about 125° C. for about 5 minutes in an oven. The surface with the first coating layer deposited on it was then corona treated for about 6 seconds.

A second coating layer was then deposited on the lens surface using the DS2 composition described in Example 2, in a similar manner as for the first coating layer, except the lens was rotated at a speed of 3000 rpm during the deposition. This second coating layer was cured at about 125° C. for about 5 minutes in an oven. The surface with the first and second coating layers deposited on it was then corona treated for about 6 seconds.

A third coating layer was then deposited on the lens surface using the HT3 composition, in a similar manner as for the first coating layer, except the lens was rotated at a speed of 1600 rpm during the deposition. This third coating layer was cured at about 125° C. for about 5 minutes in an oven, and the surface with the first, second, and third coating layers deposited on it was then corona treated for about 6 seconds.

A fourth coating layer was then deposited on the lens surface using the OS composition described in Example 1, in a similar manner as for the first coating layer, except the lens was rotated at a speed of 1800 rpm during the deposition. This fourth coating layer was cured at about 120° C. for about 30 minutes in an oven, and the surface with the first, second, third, and fourth coating layers deposited on it was then corona treated for about 10 seconds.

A fifth coating layer was then deposited on the lens surface using the DS2 composition, in a similar manner as for the first coating layer, except the lens was rotated at a speed of 1000 rpm during the deposition. This fifth coating layer was cured at about 120° C. for about 30 minutes in an oven.

Finally, a hydrophobic layer was deposited on top of the fifth coating layer using the hydrophobic coating composition described in Example 4. The liquid composition was applied by manually dipping the lens into the composition for about 10 seconds. The hydrophobic coating layer was cured by holding at room temperature for about 1 hour, then by heating for about 4 hours at about 110° C. in an oven.

Figure 5:
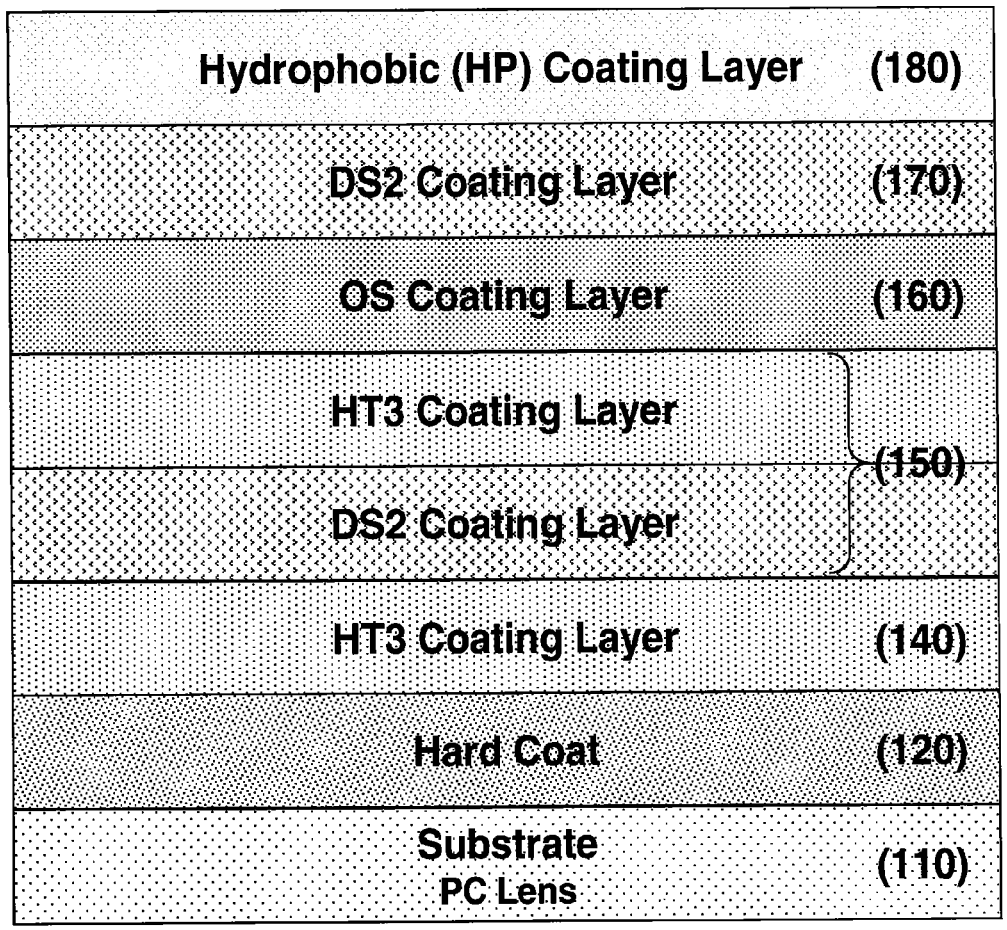
FIG. 5 is a schematic cross-sectional view, not to scale, of a substrate with an anti-reflection coating deposited thereon, as described in Example 10.

The AR coating deposited in this example is depicted schematically in FIG. 5, deposited onto a polycarbonate ophthalmic lens. The reflectance of a lens coated on both main surfaces over the wavelength range of 400 to 700 nm was measured by using the Hunter Ultrascan XE spectrophotometer. The anti-reflective properties of the coating are shown in FIG. 6. The mechanical, chemical, and environmental durability of the AR coating applied as described in this example on a PC ophthalmic lens were evaluated as described in Example 17. The AR coating passed all durability tests.

Example 11

AR Coating on High Index Plastic and Polycarbonate Lenses (Comparative)

Anti-reflective coatings were deposited on a Seiko Epson high-index plastic ophthalmic lens and on an Essilor AIR-WEAR® polycarbonate ophthalmic lens in the manner described in Example 8, except that the order of the second and third coating layers was reversed. That is, first the HT1 layer was deposited, then the DS2 layer was deposited, and then the OS layer was deposited. The HP hydrophobic layer was deposited after the OS layer.

The mechanical, chemical, and environmental durability of the coatings were evaluated as described in Example 17. The AR coating applied as described in this example on a high-index lens failed the steel wool abrasion test. No further durability tests were conducted on this high-index lens. The AR coating applied as described in this example on a poly-carbonate lens also failed the steel wool abrasion test. These results indicated that the AR coating had inferior mechanical durability.

Example 12

AR Coating on a High-Index Plastic Lens (Comparative)

An anti-reflective coating was deposited on a Seiko Epson high-index plastic ophthalmic lens in the manner described in Example 8, except that the OS (epoxide-silica) coating layer was omitted. That is, first the HT1 layer was deposited, and then the DS2 layer was deposited. The hydrophobic layer HP was deposited after the DS2 layer.

The AR coating applied as described in this example on a high-index lens showed initial crazing after curing of the AR layers was completed, indicating that the AR coating had inferior mechanical properties. Further durability tests as described in Example 17 were not conducted on the coating prepared in this example, as its condition prior to testing was already unacceptable.

Example 13

AR Coating on Polycarbonate Lens (Comparative)

An anti-reflective coating was deposited on an Essilor AIR-WEAR® polycarbonate ophthalmic lens in the manner described in Example 9, except that the top DS2 silica coating layer was omitted. That is, first the HT1 layer was deposited, and then the epoxide-silica OS layer was deposited. The hydrophobic layer HP was deposited after the OS layer.

The mechanical, chemical, and environmental durability of the coating were evaluated as described in Example 17. The AR coating applied as described in this example on a polycarbonate lens failed the steel wool abrasion test, indicating that the AR coating had inferior mechanical durability.

Example 14

AR Coating on Polycarbonate Lens (Comparative)

A three-layer anti-reflective coating was deposited on an Essilor AIRWEAR® polycarbonate ophthalmic lens in the manner described in Example 9, except that the DS2 coating composition used to deposit the third coating layer was replaced by the "LS2" low refractive index coating composition described in Example 6. That is, first the HT1 layer was deposited, then the OS layer was deposited, and then the LS2 layer was deposited instead of the DS2 layer. The hydrophobic layer HP was deposited after the LS2 layer.

The mechanical, chemical, and environmental durability of the coating were evaluated as described in Example 17. The AR coating applied as described in this example on a polycarbonate lens passed the initial crazing evaluation, but failed both the hot water and alkali exposure tests, indicating that the AR coating had inferior chemical and environmental durability. Further durability tests on this lens were not conducted.

Example 15

AR Coating on High-Index Plastic Lens (Comparative)

A three-layer anti-reflective coating was deposited on a high-index plastic ophthalmic lens in the manner described in Example 8, except that the OS coating composition used to deposit the second coating layer was replaced by the "DXS" low refractive index polysiloxane coating composition described in Example 7. That is, first the HT1 layer was deposited, then the DXS layer was deposited instead of the OS layer, and then the DS2 layer was deposited. The hydrophobic layer HP was deposited after the DS2 layer.

The mechanical, chemical, and environmental durability of the coating were evaluated as described in Example 17. The AR coating applied as described in this example on a high-index plastic lens failed the steel wool abrasion test and the alkali exposure test, indicating that the AR coating had inferior mechanical and chemical durability.

Example 16

Commercial Coated Lenses (Comparative)

Commercial ophthalmic lenses with anti-reflection coatings, manufactured by various companies, were acquired from an optics distributor (Walman Optical, Minneapolis, Minn.). The companies and the specific products acquired included Essilor International (product names ALIZE® and CRIZAL®), Sola International (TEFLON®), iCoat Company LLC (VIVIX), Hoya Corporation (HILUX, and SUPER HIVISION coating on CR-39 Lens), and Seiko Optical Products (SUPER SV coating on 1.67 high-index lens).

The mechanical, chemical, and environmental durability of the coatings on commercial lenses were evaluated as described in Example 17. All tested commercial coatings failed the high temperature and hot water exposure tests, and all but one tested commercial coating failed the alkali exposure test. These results indicated the coatings on commercial lenses had inferior environmental and chemical durability.

Example 17

Evaluation of Lens Coating Properties

Anti-reflection coatings on ophthalmic lenses, prepared as described in Examples 8 through 16, were tested for their mechanical, chemical, and environmental durability as described in this example. Results of all durability tests on anti-reflection coated lenses are shown in Table 1.

Crazing: All anti-reflection coated lenses were examined, before any mechanical, chemical, or environmental tests, using an optical research microscope (model BX51, Olympus Corporation, Tokyo, Japan) at up to 500× magnification. Anti-reflection coatings were evaluated for appearance of crazing on a pass-fail basis. If any crazing was visible at up to 500×, the coating was deemed to have failed.

Steel Wool Test: Lens coatings were tested for resistance to mechanical abrasion by steel wool. Each coated lens was cut into approximately rectangular strips of 13×35 mm, and mounted individually on an abrasion testing apparatus (Model 553-M, Yasuda Seiki Seisakusho Ltd, Nishinomiya, Japan). A pad of type 0000 steel wool was wrapped around a 15-mm diameter cylindrical head, which was then secured to the reciprocating arm of the testing apparatus. The head was rubbed linearly back and forth along the length of the cut strips for 10 cycles, with a sweep distance of 30 mm at a speed of 38 cycles/minute, under a 1-kg load. The lens was then examined under an optical microscope at magnifications up to 50× and under a high-intensity light. The lens coating was determined to have either passed or failed the test based on comparison with an industry standard. A coating showing no damage or light abrasion was judged to have passed. A coating showing moderate to heavy abrasion or removal of coating was judged to have failed.

Crosshatch Adhesion Test: Lenses with AR coatings but without the hydrophobic top layer were prepared for testing by inscribing a 10×10 square crosshatch array on the lens surface using a laboratory knife and crosshatch template. Each section of the array was about 1 mm square. Adhesion in the crosshatched area was tested by firmly pressing a cellophane tape (Type CT405AP, Nichiban Co. Ltd., Tokyo, Japan) on the crosshatched area and then removing it in one swift motion, then repeating the sequence of tape application and removal twice more. A coating showing any delamination or removal of coating (greater than 5% of the coated area), or other damage visible at up to 50× magnification or under a high-intensity light, was deemed to have failed.

All coated lens samples used for High Temperature, Hot Water, Weathering, and Alkali exposure tests described below were subjected to crosshatch adhesion tests as described above, both before and after exposure.

High Temperature Test: Lens coatings without a hydrophobic layer were tested for resistance to heat by placing the lenses in a standard laboratory oven (Model DN65, Yamato Scientific Co., Tokyo, Japan) for 30 minutes at 100° C. Each lens was then examined under an optical microscope at magnifications up to 50× and under a high-intensity light, and tested for crosshatch adhesion. The lens coating was determined to have either passed or failed the test based on the appearance of the coating. A coating showing delamination or partial removal (greater than 5% of the coated area), crazing, or cracking in either the crosshatched or other area of the lens was deemed to have failed. A coating showing no visible damage was deemed to have passed. Coatings passing the 100° C. test were re-tested above 100° C. in 10° C. increments, until the maximum passing temperature was determined.

Hot Water Test: Lens coatings without a hydrophobic layer were tested for resistance to hot water by immersing the lenses in regular tap water heated to 90° C. for 90 minutes. Each lens was then examined under an optical microscope at magnifications up to 50× and under a high-intensity light, and tested for crosshatch adhesion. Pass or fail criteria were as described for the High Temperature Test.

Weathering Test: Lens coatings without a hydrophobic layer were tested for weathering resistance using a Model CXWA Sunshine Carbon Arc WEATHER-OMETER® manufactured by Atlas Material Testing Technology LLC, Chicago, Ill. Coated lenses were placed inside the weathering chamber, and exposed to the carbon arc lamp for 120 hours at 60° C. During this period, each hour of exposure included 45 minutes of dry exposure and 15 minutes with water spray exposure. Crosshatch adhesion tests and microscopic and visual observation were conducted at intervals of 40 hours. Pass or fail criteria were as described for the High Temperature Test.

Alkali Test: Lens coatings without hydrophobic layer were tested for alkali resistance by immersing the coated lenses in an aqueous solution of 0.1N NaOH for 30 minutes, at room temperature (20° C.). After exposure, lenses were subjected to crosshatch adhesion tests and observed under an optical microscope at magnifications up to 50× and under high-intensity light. Pass or fail criteria were as described for the High Temperature Test.

TABLE 1

| AR-Coated Lens (Substrate#  - Layers) | Ex. # | Crazing (Before Tests) | Steel Wool (1 kg, 10 cycles) | High Temperature (100° C., 30 min) | Hot Water (90° C., 90 min) | Weathering (Carbon Arc) (60° C., 120 hr) | Alkali (0.1N NaOH, RT, 30 min) |
|---|---|---|---|---|---|---|---|
| (Invention) | | | | | | | |
| HI - HT1/OS/DS2 | 8 | Pass | Pass | Pass* | Pass | Pass | Pass |
| PC - HT1/OS/DS2 | 9 | Pass | Pass | Pass* | Pass | Pass | Pass |
| PC - HT3/DS2/HT3/OS/DS2 | 10 | Pass | Pass | Pass* | Pass | Pass | Pass |
| (Comparative) | | | | | | | |
| PC - HT1/DS2/OS | 11 | Pass | Fail | Pass | Pass | Pass | Pass |
| HI - HT1/DS2/OS | 11 | Pass | Fail | Not tested | Not tested | Not tested | Not tested |
| HI - HT1/DS2 | 12 | Fail | Not tested | Not tested | Not tested | Not tested | Not tested |
| PC - HT1/OS | 13 | Pass | Fail | Pass | Pass | Pass | Pass |
| PC - HT1/OS/LS2 | 14 | Pass | Not tested | Not tested | Fail | Not tested | Fail |
| HI - HT1/DXS/DS2 | 15 | Pass | Fail | Pass | Pass | Pass | Fail |
| Essilor ALIZE ® | 16 | Pass | Pass | Fail | Fail | Pass | Fail |
| Essilor CRIZAL ® | 16 | Pass | Pass | Fail | Fail | Pass | Pass |
| Sola TEFLON ® | 16 | Pass | Pass | Fail | Fail | Pass | Fail |
| iCoat VIVIX | 16 | Pass | Pass | Fail | Fail | Pass | Fail |
| Hoya HILUX | 16 | Pass | Pass | Fail | Fail | Pass | Fail |
| Hoya SUPER HIVISION (CR-39) | 16 | Pass | Pass | Fail | Fail | Pass | Fail |
| Seiko SUPER SV (HI, 1.67) | 16 | Pass | Pass | Fail | Fail | Pass | Fail |

HI = high-index plastic lens; PC = polycarbonate lens;
*Passed High Temperature Test at up to 130° C.

What is claimed:

1. An article comprising a substrate and an anti-reflection coating deposited onto at least one main surface of the substrate, said anti-reflection coating comprising:
    (a) a first coating layer having a high refractive index deposited onto the substrate;
    (b) an epoxide-silica coating layer deposited onto the first coating layer, wherein the epoxide-silica coating layer comprises a silicon dioxide component and an organosilicate component having the molecular formula $R_a SiO_{(4-a)/2}$, in a continuous cross-linked network, wherein R is an organic group that forms stable chemical bonds with silicon, and a is an integer between 1 and 3; and
    (c) a silica coating layer deposited directly onto the epoxide-silica coating layer, consisting essentially of silicon dioxide; wherein the silica coating layer is the outermost layer of the anti-reflection coating.

2. The article of claim 1, wherein the anti-reflection coating further comprises a stack of coating layers having alternating a low refractive index and a high refractive index, deposited onto the first coating layer, such that the alternating layers are between the substrate and the epoxide-silica coating layer.

3. The article of claim 2, wherein the stack of coating layers consists of a single coating layer having a low refractive index, and a single coating layer having a high refractive index.

4. The article of claim 2, wherein the low refractive index is a refractive index lower than about 1.60 at a wavelength of 510 nm.

5. The article of claim 2, wherein the coating layer or layers having a low refractive index comprises silica.

6. The article of claim 1, wherein the high refractive index is a refractive index higher than about 1.70 at a wavelength of 510 nm.

7. The article of claim 1, wherein the first coating layer comprises titania.

8. The article of claim 1, wherein the substrate comprises a transparent polymer or glass.

9. The article of claim 1, further comprising a primer coating layer, a hard coating layer, or the combination thereof, between the substrate and the anti-reflection coating.

10. The article of claim 1, further comprising a layer of hydrophobic coating deposited on top of the outermost silica coating layer.

11. A process for preparing the article of claim 1, comprising the steps of:
    applying a first coating composition onto the substrate to deposit the first coating layer;
    applying an epoxide-silica coating composition onto the first coating layer to deposit the epoxide-silica coating layer;
    applying a silica coating composition directly onto the epoxide-silica coating layer to deposit the silica coating layer, wherein the silica coating layer is the outermost layer of the anti-reflection coating; and
    curing each deposited layer after each step of depositing.

12. The process of claim 11, further comprising, prior to depositing the epoxide-silica coating layer, a step of depositing a stack of coating layers having alternating a low refractive index and a high refractive index onto the first coating layer, wherein the low refractive index is a refractive index lower than about 1.60 at a wavelength of 510 nm.

13. The process of claim 12, wherein the stack of coating layers consists of one coating layer having a low refractive index and one coating layer having a high refractive index.

14. The process of claim 12, wherein the coating layer having the low refractive index coating is prepared by applying a low refractive index coating composition comprising a silicon alkoxide, water, an acid, and a solvent.

15. The process of claim 14, wherein the low refractive index coating composition comprises
    (a) silicon alkoxide selected from the group consisting of tetramethyl orthosilicate, tetraethyl orthosilicate, or the combination thereof,
    (b) nitric acid, hydrochloric acid, or the combination thereof,
    (c) ethyl alcohol, 1-methoxy-2-propanol, or the combination thereof, and
    (d) water, wherein the coating composition does not contain any other silicon alkoxide.

16. The process of claim 11, wherein the epoxide-silica and silica coating layers have a refractive index lower than about 1.60 at a wavelength of 510 nm.

17. The process of claim 16, wherein the epoxide-silica coating composition comprises
(a) tetramethyl orthosilicate, tetraethyl orthosilicate, or a combination thereof,
(b) (3-glycidoxypropyl)trimethoxysilane,
(c) methylenesuccinic acid,
(d) nitric acid, hydrochloric acid, or the combination thereof,
(e) ethyl alcohol, 1-methoxy-2-propanol, or the combination thereof, and
(f) water.

18. The process of claim 11, wherein the epoxide-silica coating composition comprises a non-epoxy-functional silicon alkoxide, an epoxy-functional silicon alkoxide, a curing agent compatible with epoxy-functional molecules, acid, solvent, and water.

19. The process of claim 11, wherein the silica coating composition comprises
(a) silicon alkoxide selected from the group consisting of tetramethyl orthosilicate, tetraethyl orthosilicate, or the combination thereof,
(b) nitric acid, hydrochloric acid, or the combination thereof,
(c) ethyl alcohol, 1-methoxy-2-propanol, or the combination thereof, and
(d) water;
wherein the coating composition does not contain any other silicon alkoxide.

20. The process of claim 11, wherein the first coating composition comprises a titanium alkoxide, an epoxy-functional silicon alkoxide, a non-epoxy functional silicon alkoxide, a curing agent, water, an acid, and a solvent.

21. The process as defined in claim 20, wherein the first coating composition comprises
(a) titanium(IV) isopropoxide,
(b) (3-glycidoxypropyl)trimethoxysilane,
(c) tetramethyl orthosilicate, tetraethyl orthosilicate, or a combination thereof,
(d) hexahydrophthalic anhydride, methylenesuccinic acid, or a combination thereof,
(e) nitric acid, hydrochloric acid, or a combination thereof,
(f) ethyl alcohol, 1-methoxy-2-propanol, or a combination thereof, and
(g) water.

22. The process of claim 11, wherein each coating layer is deposited by spin coating or dip coating, and the curing is achieved by thermal treatment.

23. The process of claim 11, wherein the substrate comprises a transparent polymeric material or glass.

* * * * *